(12) United States Patent
Hoeckel et al.

(10) Patent No.: US 11,578,632 B2
(45) Date of Patent: Feb. 14, 2023

(54) EXHAUST GAS HEATER (71) Applicant: Purem GmbH, Neunkirchen (DE)

(72) Inventors: Sandra Hoeckel, Esslingen (DE); Fatih Uysal, Plochingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/469,332

(22) Filed: Sep. 8, 2021

(65) Prior Publication Data
US 2022/0074333 A1 Mar. 10, 2022

(30) Foreign Application Priority Data

Sep. 8, 2020 (DE) ...................... 10 2020 123 376.0

(51) Int. Cl.
| *F01N 3/20* | (2006.01) |
| *F01N 3/28* | (2006.01) |
| *F23J 15/08* | (2006.01) |
| *H05B 3/32* | (2006.01) |

(52) U.S. Cl.
CPC ............. *F01N 3/2013* (2013.01); *F01N 3/28* (2013.01); *F23J 15/08* (2013.01); *H05B 3/32* (2013.01); *H05B 2203/003* (2013.01); *H05B 2203/017* (2013.01); *H05B 2203/022* (2013.01)

(58) Field of Classification Search
CPC . F01N 3/3013; F01N 3/20; F01N 3/26; F01N 3/027; F01N 3/28; F01N 2240/16; F01N 13/008; F23J 15/08; H05B 3/32; H05B 2203/003; H05B 2203/017; H05B 2203/022

USPC .......................................................... 60/320
See application file for complete search history.

(56) References Cited

U.S. PATENT DOCUMENTS

| 4,723,973 A | * | 2/1988 | Oyobe | .................... F01N 3/027 60/303 |
| 5,409,669 A | * | 4/1995 | Smith | ................... F01N 3/0226 219/535 |
| 10,801,388 B2 | | 10/2020 | Culbertson et al. | |
| 2020/0109652 A1 | * | 4/2020 | Aufranc | ................ F01N 3/2013 |
| 2021/0332730 A1 | * | 10/2021 | Kurpejovic | ............. F01N 3/027 |
| 2021/0348535 A1 | * | 11/2021 | Tchamgoue | ............ F01N 13/18 |

FOREIGN PATENT DOCUMENTS

| DE | 694 07 065 T2 | 7/1998 |
| DE | 10 2005 011 657 A1 | 9/2006 |
| DE | 10 2019 126 630 A1 | 4/2020 |
| DE | 20 2020 104 976 U1 | 10/2020 |
| DE | 20 2021 100 999 U1 | 3/2021 |
| EP | 2 935 996 B1 | 3/2019 |
| JP | P2015-6100 A | 1/2015 |

* cited by examiner

Primary Examiner — Devon C Kramer
Assistant Examiner — Kelsey L Stanek
(74) Attorney, Agent, or Firm — Walter Ottesen, P.A.

(57) ABSTRACT

An exhaust gas heater for an exhaust gas system of a combustion engine includes a carrier and at least one heating conductor through which a current flows. The heating conductor is mounted on the carrier. The heating conductor is provided via separation from a metal flat material blank. A method of making an exhaust gas heater includes a step of separating the heating conductor from the metal flat material blank.

14 Claims, 6 Drawing Sheets

EXHAUST GAS HEATER

CROSS REFERENCE TO RELATED APPLICATION

This application claims priority of German patent application no. 10 2020 123 376.0, filed Sep. 8, 2020, the entire content of which is incorporated herein by reference.

TECHNICAL FIELD

The present disclosure relates to an exhaust gas heater for an exhaust gas system of a combustion engine.

BACKGROUND

U.S. Pat. No. 10,801,388 discloses an exhaust gas heater, in which a heating conductor formed with a substantially circular heating conductor cross-section is arranged in a spirally wound manner in a tubular housing through which exhaust gas can flow. By applying an electric voltage to connection ends of the heating conductor, the heating conductor is heated so that heat can be transferred to the exhaust gas flowing around the heating conductor.

DE 10 2005 011 657 A1 discloses an exhaust gas heater for an exhaust gas system of a combustion engine, in which a heating conductor is provided, which is constructed using a strip-like flat material and has a structure which surrounds a center axis and is axially extended in a spiral and helical manner.

SUMMARY

It is an object of the present invention to provide an exhaust gas heater for an exhaust gas system of a combustion engine, with which an improved heating behavior can be achieved with a construction which is easily realized.

The aforementioned object can, for example, be achieved via an exhaust gas heater for an exhaust gas system of an internal combustion engine. The exhaust gas heater includes a carrier and at least one heating conductor, which is carried on the carrier and through which a current flows, wherein the heating conductor is provided via separation from a metal flat material.

The procedure for producing the heating conductor for such an exhaust gas heater is easily realized since this merely requires the provision of a blank of the metal flat material and the separation of the heating conductor, for example by punching or cutting. At the same time, with this production, the heating conductor can be provided with virtually any path and a varying heating conductor cross-section. This enables a variation of the locally provided heat, and therefore adaptation to a possibly uneven flow against the heating conductor, over the cross-section of such an exhaust gas heater, which could not be realized by winding a heating conductor provided from a wire-like or strip-like long material, for example, or which could only be realized with very great effort.

As a result of providing the heating conductor via separation from a metal flat material, it is easily possible to form the heating conductor with an angular, preferably rectangular, conductor cross-sectional contour. With the same conductor cross-sectional area, an angular conductor cross-sectional contour has a larger surface than a circular conductor cross-sectional contour, so that a larger surface for transferring heat to the exhaust gas flowing around it can be provided on the heating conductor.

In order to provide various functional regions on the heating conductor which have an optimized configuration for the functions to be fulfilled thereby, it is proposed that the heating conductor has a holding region held on the carrier and a heating region around which exhaust gas can flow.

Since the exhaust gas heater is generally accommodated in a, for example, tubular housing through which exhaust gas can flow, it is particularly advantageous if the holding region is arranged radially outside the heating region relative to an exhaust gas heater center axis.

An axially compact configuration can be achieved in that the holding region and the heating region are arranged substantially in a plane which is preferably orthogonal to the exhaust gas heater center axis. In this case, it should be pointed out that the exhaust gas heater obviously has an extent transverse to such a notional plane. Such a plane can be defined, for example, by an axial center plane of the heating conductor or by one of the two axial sides or end faces of the heating conductor. Since the heating conductor is generated via separation from a generally planar metal flat material, instead of being able to increase the available surface for the heat transfer via subsequent axial extension of the heating conductor, it is merely the spacing between mutually adjacent portions of the heating conductor which is increased, which can in turn result in an impairment of the thermal interaction with exhaust gas flowing around the heating conductor. It is therefore advantageous to keep the heating conductor created, for example, via separation from a planar metal flat material in such a planar structure.

For stable attachment of the heating conductor to the carrier, it is proposed that the carrier comprises a carrier body surrounding the heating conductor radially on the outside and overlapping it radially in the holding region on at least one axial side, and/or that the carrier, on at least one axial side of the heating conductor, comprises a supporting arrangement supporting the heating conductor axially.

In order to be able to attach the heating conductor to the carrier or to be able to integrate it in the carrier body, the carrier body can include a first carrier body part having an axial portion axially overlapping the holding region radially on the outside and a first radial portion extending radially inwards from the axial portion and radially overlapping the holding region, at least in part, on a first axial side, and a second carrier body part fixed to the first carrier body part and having a second radial portion overlapping the holding region radially, at least in part, on a second axial side.

For a stable coupling between the heating conductor and the carrier over the entire circumference, it is proposed that the first carrier body part and/or the second carrier body part is formed in a ring-like manner.

Since, for reasons of thermal and chemical stability, the carrier body is advantageously constructed using metal material, it is proposed that electrically insulating material is arranged between the carrier body and the holding region in order to avoid an electrical short circuit.

In a particularly advantageous configuration in terms of the thermal interaction between the heating region and the exhaust gas flowing around it, it can be provided that the heating conductor is substantially not covered with electrically insulating material in its heating region.

Particularly when the heating conductor is encompassed by the carrier in its holding region, at least in certain areas, with the interposition of electrically insulating material, in order to avoid heat accumulation in this region it is proposed that the heating conductor has a larger conductor cross-sectional area in its holding region than in its heating region. As a result of the larger conductor cross-sectional area in the holding region, the heating conductor has a lower electrical resistance relative to a unit of length in the holding region than in the heating region, so that, owing to the greater voltage drop in the heating region, more heat is provided there than in the holding region.

It can furthermore be provided that the heating conductor has a varying cross-sectional size in its heating region. This means that the heating region can have different length portions of different cross-sectional sizes so that the varying cross-sectional size results in regions with different electrical resistance and therefore also with different heat quantities which can be transferred to the exhaust gas. This is particularly advantageous in systems in which the flow against the heating conductor may be uneven and therefore heat cannot be removed evenly from the heating conductor by the exhaust gas flowing around it. The occurrence of overheating regions can thus be avoided.

Two connection portions can be provided on the holding region for electrical contacting of the heating conductor.

For an extensive thermal interaction between the heating conductor and the exhaust gas flowing around it over the flow cross-section, the heating conductor, at least in its heating region, can be formed to extend in the manner of a winding, at least in certain areas.

To this end, it can be provided, for example, that the heating conductor includes at least one meandering winding field having a plurality of meandering winding portions arranged in radial succession relative to an exhaust gas heater center axis and extending substantially in the circumferential direction, wherein, in a first circumferential end, at least one, preferably more, meandering winding portions adjoin a meandering winding portion which is positioned radially further inside and, in a second circumferential end, adjoin a meandering winding portion which is positioned radially further outside.

To achieve an inherently stable structure of the heating conductor distributed over the circumference, it is proposed that a plurality of successive meandering winding fields in the circumferential direction is provided, and that, in mutually directly adjacent meandering winding fields in the circumferential direction, a radially inner, preferably a radially innermost, meandering winding portion of one meandering winding field in a radially inner connection region adjoins a radially inner, preferably a radially innermost, meandering winding portion of a meandering winding field which is directly adjacent to the one meandering winding field in a first circumferential direction, and/or that a radially outer, preferably a radially outermost, meandering winding portion of the one meandering winding field in a radially outer connection region adjoins a radially outer, preferably a radially outermost, meandering winding portion of a meandering winding field which is directly adjacent to the one meandering winding field in a second circumferential direction. An extension of individual winding portions which is extended over a very large circumferential region can thus be avoided.

In at least one, preferably each, meandering winding field, the holding region can provide a radially outermost meandering winding portion.

The disclosure furthermore relates to a method for producing an exhaust gas heater, constructed according to the disclosure, for an exhaust gas system, comprising providing a plate-like metal flat material blank and separating the heating conductor from the metal flat material blank.

In this method, the heating conductor can be separated from the metal flat material blank by punching or cutting, preferably laser cutting or water jet cutting.

The disclosure furthermore relates to an exhaust gas system for a combustion engine, comprising a preferably tubular exhaust gas routing component and at least one exhaust gas heater constructed according to the disclosure, which is arranged in the exhaust gas routing component and is preferably produced by the method according to the disclosure.

BRIEF DESCRIPTION OF THE DRAWINGS

The invention will now be described with reference to the drawings wherein.

DESCRIPTION OF THE PREFERRED EMBODIMENTS

Figure 1:
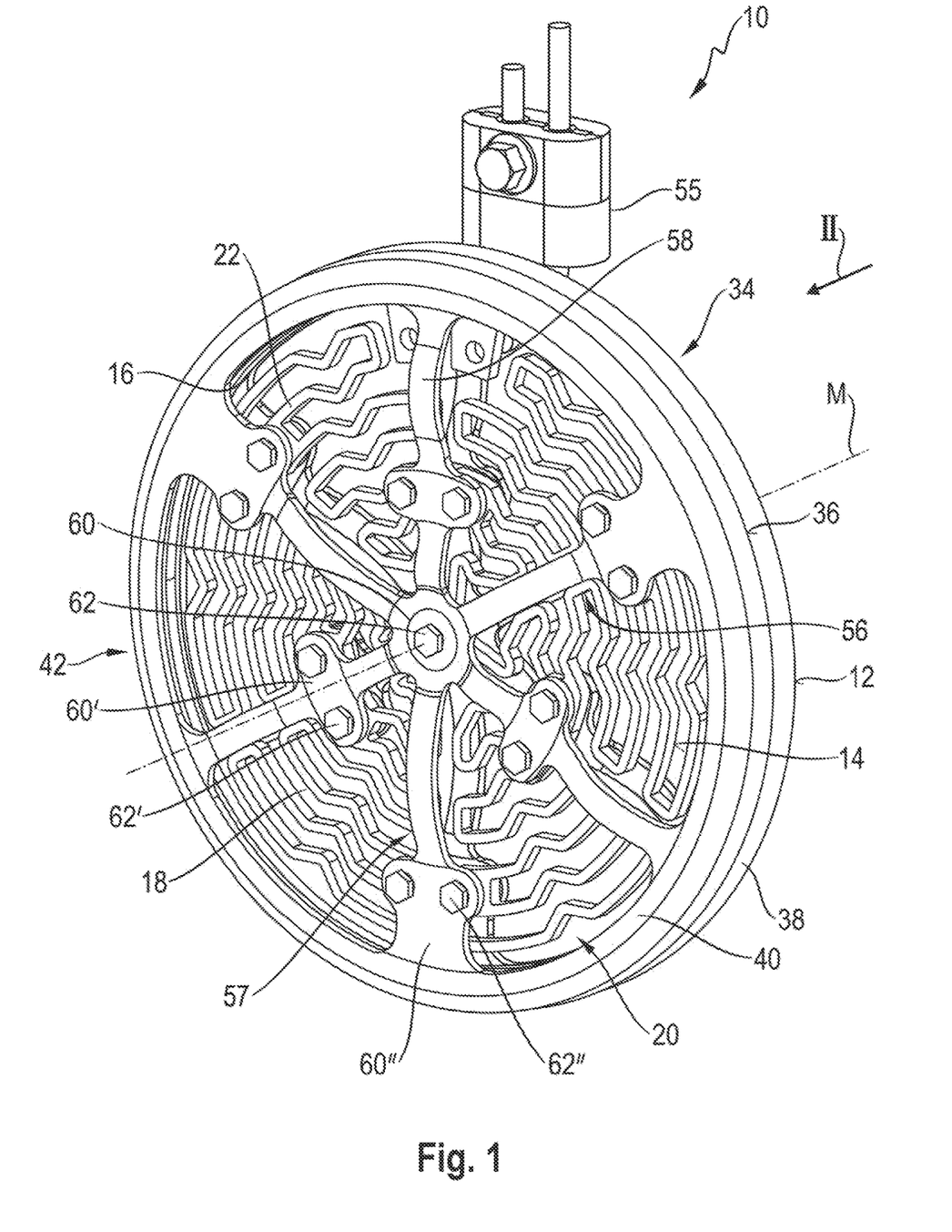
FIG. 1 shows a perspective view of an exhaust gas heater for an exhaust gas system of a combustion engine, as seen in viewing direction I in FIG. 2.
Figure 2:
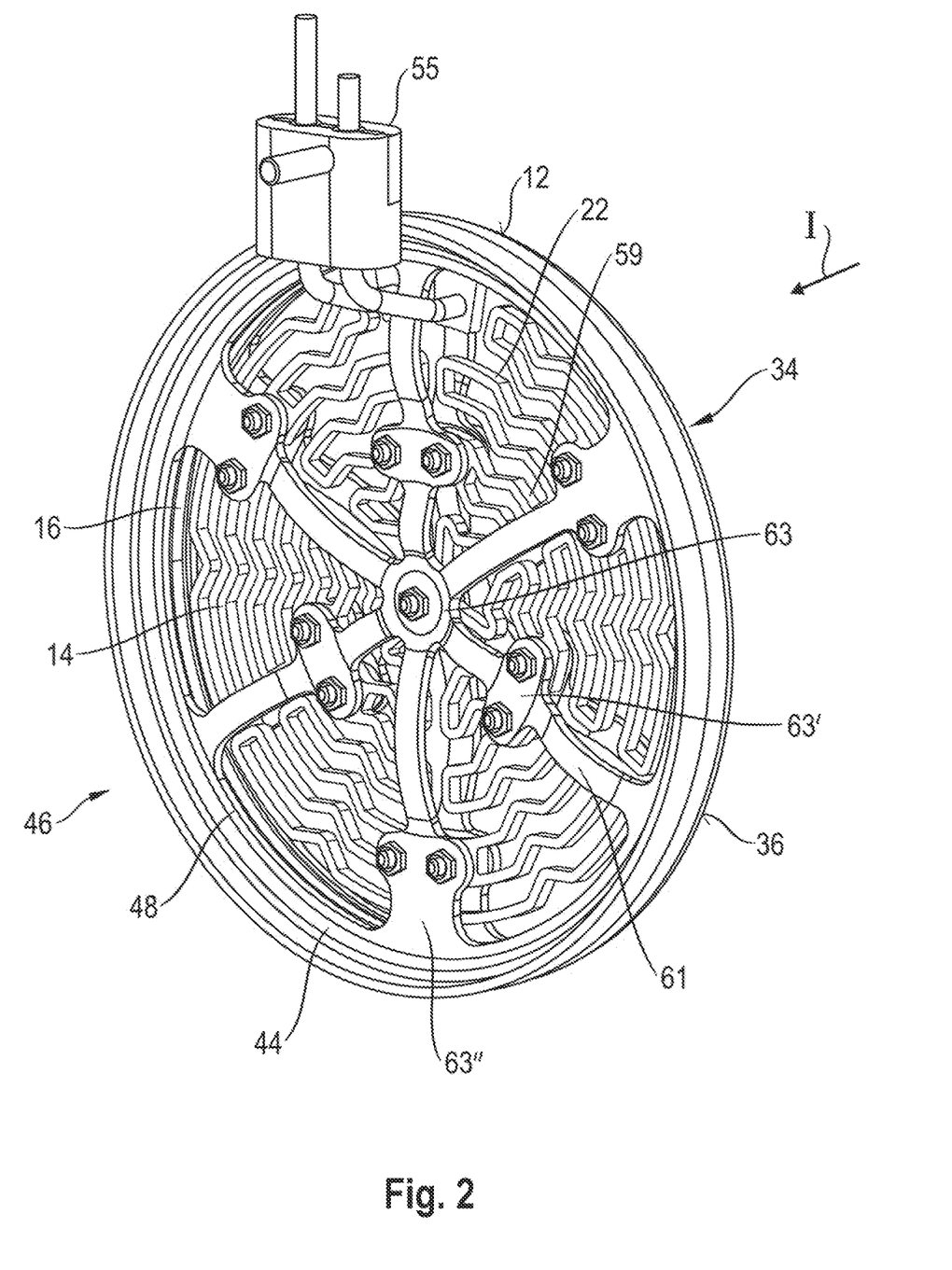
FIG. 2 shows a perspective view of the exhaust gas heater of FIG. 1, as seen in viewing direction II in FIG. 1.
Figure 3:
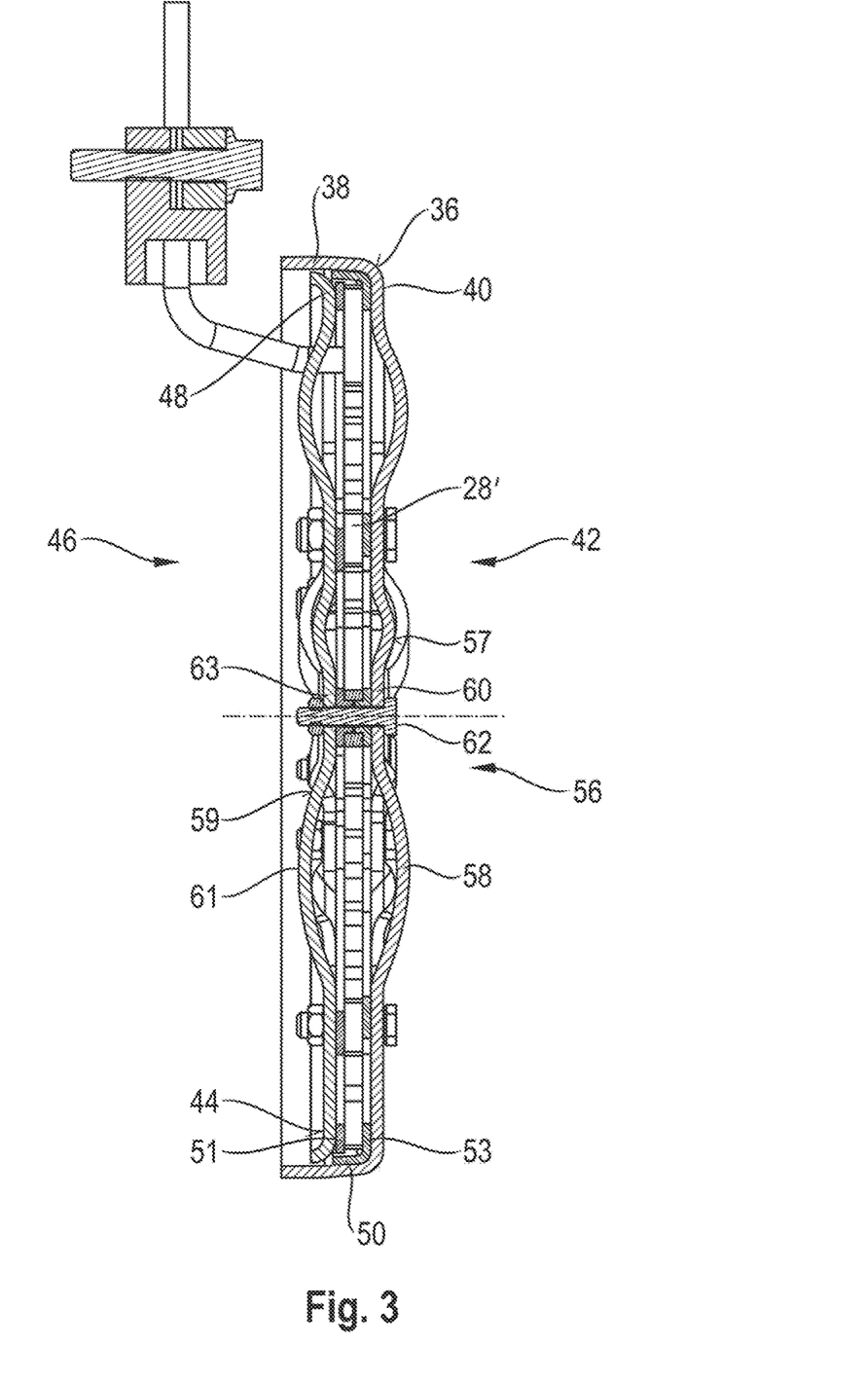
FIG. 3 shows an axial sectional view of the exhaust gas heater of FIGS. 1 and 2.

An exhaust gas heater 10 shown in FIGS. 1 to 3 is formed, for example, with a substantially circular outer contour for adaptation to the circular inner cross-section of an exhaust gas routing housing in which it is received. The exhaust gas heater 10 comprises in its radially outer region—relative to an exhaust gas heater center axis M—an annular carrier and a heating conductor 14 carried on the annular carrier 12.

The heating conductor 14 has, radially on the outside, a holding region 16 carried on the carrier 12 and has, radially inside the holding region 16, a heating region 18 around which exhaust gas can flow.

The heating conductor 14 of the exhaust gas heater 10 constructed according to the disclosure is provided via separation from a metal flat material blank, constructed for example using a chrome/nickel alloy. In this case, the heating conductor 14 can be provided, for example, by punching with the desired contour. Alternatively, the heating conductor 14 can be separated from the metal flat material blank by cutting, for example laser cutting or water jet cutting. Since such a metal flat material blank generally has a planar form, the heating conductor 14 also has a substantially planar structure located in a plane which is substantially orthogonal to the exhaust gas heater center axis M.

In the illustrated embodiment, the heating conductor 14 is formed with a winding-like structure. It can be clearly seen in FIG. 4 that the heating conductor 14 is provided with a total of six meandering winding fields 20 constructed substantially identically to one another. Meandering winding portions 22, arranged radially adjacent to one another, are arranged in each of the meandering winding fields 20 such that, irrespective of local deviations, they extend substantially in the circumferential direction around the exhaust gas heater center axis M, wherein the meandering winding portions have an increasing circumferential length from radially on the inside to radially on the outside and the meandering winding fields 20 therefore have an approximately triangular circumferential or peripheral contour. At each of their two circumferential ends 24, 26, the meandering winding portions 22 each adjoin a meandering winding portion 22 positioned either radially further outside or radially further inside via substantially radially extending connecting portions 28. A respective radially innermost meandering winding portion 22' of a respective meandering winding field 20 is connected to the radially innermost meandering winding portion 22' of another meandering winding field 20, which is directly adjacent in a first circumferential direction, via an inner connection region 30. A respective outermost meandering winding portion 22" is connected to the radially outermost meandering winding portion 22' of a meandering winding field 20, which is directly adjacent in the second circumferential direction, via an outer connection region 32, so that, in the heating conductor 14, all successive meandering winding fields 20 in the circumferential direction are connected to one another in series.

Figure 4:
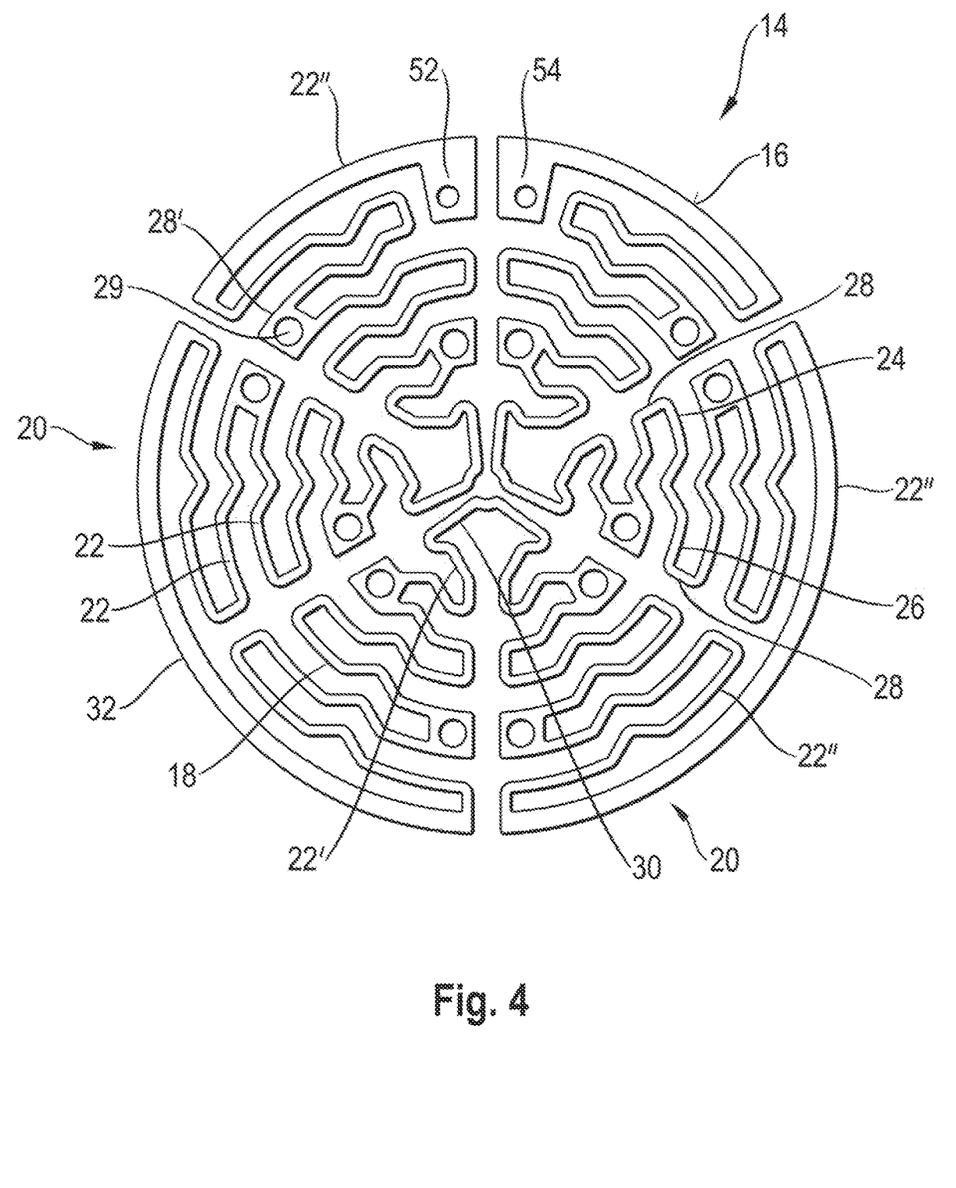
FIG. 4 shows a plan view of a heating conductor of the exhaust gas heater of FIGS. 1 to 3.

The radially outermost meandering winding portions 22' of the meandering winding fields 20 substantially form the holding region 16 of the heating conductor 14, in which this latter is held on the carrier 12. To this end, the carrier 12 is formed with a carrier body 34 encompassing the heating conductor 14 in the region of the radially outermost meandering winding portions 22", that is, in the holding region 16. The carrier body 34 has a first carrier body part 36, which overlaps the holding region 16 of the heating conductor 14 axially with an axial portion 38. The first carrier body part 36 furthermore has a first radial portion 40 extending radially inwards from the axial portion 38. On a first axial side 42, the first carrier body part 36 overlaps the holding region 16 of the heating conductor 14 virtually completely with the first radial portion 40 in the radial direction.

The carrier body 36 furthermore has a second carrier body part 44, which is inserted into the first carrier body part 36 on a second axial side 46 of the heating conductor 14 and is fixed thereto, for example, with a material fit, for example by welding. With a second radial portion 48, the second carrier body part 44 extends radially inwards and overlaps the holding region 16 of the heating conductor 14 virtually completely in the radial direction.

The carrier body 34 therefore defines a U-shaped structure, which is open radially inwards and in which the holding region 16 of the heating conductor 14 is received with the radially outermost meandering winding portions 22' which substantially provide this heating conductor, with the interposition of electrically insulating material 50. The electrically insulating material 50 covers the holding region 16 of the heating conductor 14 at the two axial sides 42, 46 and radially on the outside. To this end, the electrically insulating material is formed with a first annular insulating element 51 abutting axially against the holding region 16 on the second axial side 46 and a second annular insulating element 53 abutting axially against the holding region 16 on the first axial side 42 and overlapping it radially on the outside. The heating conductor 14, which is, in particular, substantially not covered by electrically insulating material in its heating region 18, is therefore electrically insulated with respect to the carrier 12.

For the electrical contacting of the heating conductor 14, this has, on two successive outermost meandering winding portions 22' in the circumferential direction which are not connected to one another by an outer connection region 32, a respective connection portion 52 and 54 protruding radially inwards beyond the carrier 12 from the meandering winding portions, that is, from the holding region 16. A contact unit 55 reaching through a housing receiving the exhaust gas heater 10 is connected to the connection portions in order to couple the heating conductor 14 to a voltage source.

In order to not only be able to hold the heating conductor 14 on the carrier 12 such that it is stable in its radially outer region but to also ensure a stable and defined positioning of the heating conductor 14 over the entire radial extent, the carrier 12 includes a supporting arrangement 56 supporting the heating conductor 14 axially on both axial sides 42, 46. Associated with each carrier body part 36, 44, the supporting arrangement 56 includes a star-like supporting structure 57, 59, in each case with a plurality of substantially radially extending supporting arms 58, 61 which adjoin one another radially on the inside in a centrally positioned coupling region 60, 63 and respectively adjoin the first radial portion 40 of the first carrier body part 36 and the second radial portion 48 of the second carrier body part 44 radially on the outside. The supporting structures 57, 59 of the supporting arrangement 56 are preferably each provided in one piece as a formed sheet metal part with the first carrier body part 36 and the second carrier body part 44 respectively.

In the radially central, plate-like coupling regions 60, 63 of the supporting arrangement 56, the heating conductor 14 is fastened to the supporting arrangement 56 in the region of the inner connection regions 30 which extend there in each case and connect two radially innermost meandering winding portions 22' of mutually directly adjacent meandering winding fields 20. To this end, for example, a fastening pin 62, for example a fastening screw, fixed to the coupling regions 60, 63 can be used so that the radially inner connection regions 30 of the heating region 18 are clamped between the coupling regions 60, 63 in an axially fixed manner.

Figure 5:
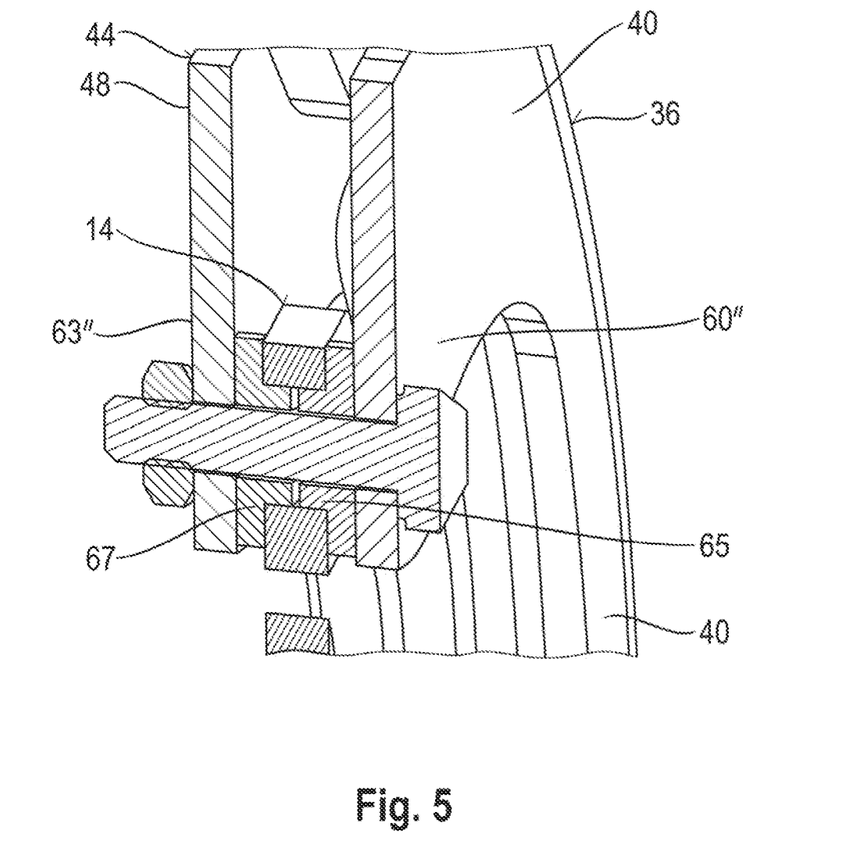
FIG. 5 shows a detailed view of the connection of the heating conductor to a supporting arrangement; and, FIG. 6 shows a schematic of an exhaust gas system of a combustion engine, which exhaust gas system contains an exhaust gas heater.

The heating conductor 14 can also be fastened to the supporting arrangement 56 using respective fastening pins 62', 62" in coupling regions 60', 63' or 60", 63" of the supporting arms 58, 61 of the supporting structures 57, 59 which are located radially further outside. In this case, it can be seen that coupling regions 60', 63' or 60", 63" provided in mutually directly adjacent supporting arms 58 in the circumferential direction are located radially offset from one another in order to enable the heating conductor to be fastened in different radial regions relative to the supporting arrangement 56 in an alternating manner.

In the area of the coupling regions 60, 63' or 60", 63" or the fixing pins 62', 62", the heating conductor 14 is locally covered by electrically insulating material, as well as in the area of the coupling regions 60, 63, in order to avoid the occurrence of an electrical short circuit. This electrically insulating material can include two insulating sleeves 65, 67 positioned on both sides of the heating conductor 14 and constructed, for example, using ceramic material, which insulating sleeves electrically insulate the heating region 18 of the heating conductor 14 with respect to the respective coupling regions 60', 63' or 60", 63" and the fastening pins 62', 62" passing through them. In order to enable an engagement of the insulating sleeves 65, 67 in the heating region 18 in this case, the heating conductor 14 can have, in the heating region 18, a respective connecting portion 28', associated with each of the coupling regions 60, 63' or 60", 63", which is widened in the circumferential direction and has an opening 29 formed therein.

The electrical insulation of the heating conductor 14 in the different connecting portions 28' or coupling regions 60, 60', 60" or 63, 63', 63" with respect to the supporting structures 57, 59 does not preclude the possibility that, within the scope of the present disclosure, the heating conductor 14 is not covered with electrically insulating material in essential regions of its heating region 18 for the purpose of improved thermal interaction with exhaust gas flowing around it.

As a result of providing the heating conductor 14 as a component which is separated from a metal flat material, it is possible, on the one hand, to create the heating conductor 14 in a one-piece structure in a manner which can be executed easily and precisely. As the winding-like structure of the heating conductor 14 illustrated in FIG. 4 already shows, this heating conductor can be produced with virtually any path, wherein, in particular, the option also arises of varying the radial extent of the heating conductor in different length portions thereof with respect to one another. This can be seen, for example, in FIG. 4, in that the heating conductor 14 is formed with a greater radial extent, that is, width, in its holding region 16, that is, in the region of the radially outermost meandering winding portions 22", than in the meandering winding portions 22 which are located radially further inside. It is thus achieved that, in the holding region 16, that is, where the heating conductor 14 is encompassed by the carrier 12 or the electrically insulating material 50 in wide areas, the heating conductor 14—relative to a unit of length—has a lower electrical resistance and is therefore not heated as strongly when an electric voltage is applied as it is in the meandering winding portions 22, 22' which have a smaller conductor cross-sectional area. This does not exclude the fact that, in the holding region 16 or in the heating region 18, local deviations in the conductor cross-section may be present, in which, for example, the heating region 18 has a larger conductor cross-section than in the holding region 16. The significance of this aspect within the scope of the present disclosure is that, in the essential extent portions, the heating region 18 and the holding region 16 provide this relationship via their respective conductor cross-section. The occurrence of a heat accumulation where the heating conductor 14 is encompassed by the carrier 12 is thus avoided and the use of the electrical energy is promoted in the regions in which the thermal interaction between the heating conductor 14 and the exhaust gas to be heated is significantly better.

The production of the heating conductor 14 via separation from a metal flat material also enables, for example, an uneven distribution of portions of the heating region 18 over the circumference to be provided so that, distributed over the flow cross-section, a varying heat input into the exhaust gas flowing around the exhaust gas heater 10 is achieved in a manner adapted to the prevailing flow conditions in a respective exhaust gas system. Locally occurring overheating or locally occurring deficits in the heating of the exhaust gas flow can thus be avoided.

The fact that the heating conductor 14 has a substantially rectangular conductor cross-sectional contour as a result of being separated from a metal flat material also ensures an efficient heat transfer to the exhaust gas flowing around the heating conductor. With the same conductor cross-sectional area, this conductor cross-sectional contour has a larger surface than a circular conductor cross-sectional contour and therefore ensures a larger surface for the thermal interaction with the exhaust gas to be heated.

Figure 6:
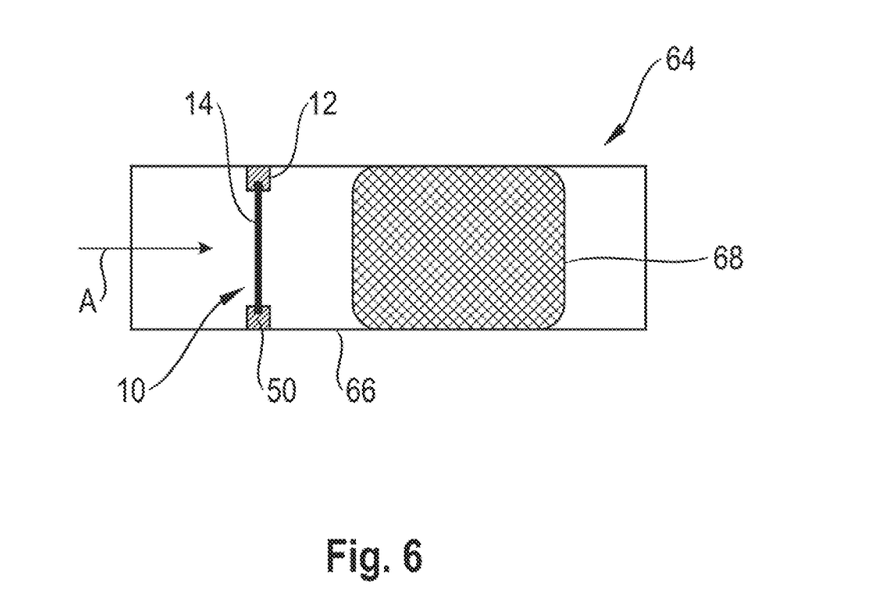

In a schematic illustration, FIG. 6 shows an exhaust gas system 64, in which an exhaust gas heater 10 (described in detail above) is integrated. The exhaust gas system 64 includes an exhaust gas routing component 66, which has a tubular form, for example, and in which the exhaust gas heater 10 is arranged upstream relative to an exhaust gas treatment unit 68, for example a catalytic converter or particle filter. The exhaust gas A flowing towards the exhaust gas treatment unit 68 firstly flows around the exhaust gas heater 10 positioned upstream of the exhaust gas treatment unit 68 or around the heating conductor 14 of the exhaust gas heater, is heated there and therefore inputs heat into the exhaust gas treatment unit 68. As a result of this, in particular in a start phase of a combustion engine with a still comparatively low exhaust gas temperature and with comparatively cold components of the exhaust gas system 64, the exhaust gas treatment unit 68 is heated more quickly, and thus brought to operating temperature, by the exhaust gas A heated at the exhaust gas heater 10. The length of time during which the, for example, catalytic reaction to be carried out in the exhaust gas treatment unit 68 is unable to proceed due to the temperature being too low can therefore be significantly reduced.

It should be pointed out that the exhaust gas heater illustrated in the figures can obviously deviate from the specifically illustrated embodiment in terms of a wide variety of configuration aspects. This relates, in particular, to the path of the heating conductor, which may be provided such that it does not necessarily have a structure winding in a meandering manner, but rather a spiral structure, and which, as already mentioned, can be formed with path structures which deviate from one another in different circumferential regions. The heating conductor can have a varying cross-sectional size, that is, regions of different cross-sectional size, in particular in its heating region, so that, owing to the electrical resistance which also varies with the cross-sectional size along the path of the heating region, the heat quantities generated in different regions can be different and an inhomogenous flow of exhaust gas can be compensated to avoid overheating regions. A plurality of heating conductors 14, which are kept insulated from one another, for example, or which are in direct contact, can also be positioned in axial succession on a carrier 12, for example. In an exhaust gas system, a plurality of exhaust gas heaters constructed with a heating conductor can obviously be positioned in an exhaust gas routing housing. This is, in particular, also possible since, according to a particularly advantageous aspect in the case of the exhaust gas heater 10 constructed according to the disclosure, the heating conductor 14 is located substantially in the plane corresponding to the plane of the drawing in FIG. 4, that is, it is not formed by subsequent axial extension in such a way that the central region of the heating conductor 14 is located axially offset relative to the holding region 16 located radially on the outside. Since the heating conductor 14 is created via separation from a substantially planar metal flat material, axial extension of the heating conductor 14 would not result in an increase in the available heat transfer surface, but would merely result in a greater spacing between mutually adjacent portions of the heating conductor 14 and would therefore possibly contribute to an impairment of the thermal interaction with the exhaust gas flowing around the heating conductor 14. Nevertheless, it should be pointed out that, if this is advantageous due to the flow conditions, for example, the heating conductor 14 can also have such an axially extended structure with an axial offset between its radially outer region and its radially inner region. To this end, for example, the supporting arrangement 56 axially supporting the heating conductor 14 can also have such a, for example, conically axially extended structure.

It is understood that the foregoing description is that of the preferred embodiments of the invention and that various changes and modifications may be made thereto without departing from the spirit and scope of the invention as defined in the appended claims.

What is claimed is:

1. An exhaust gas heater for an exhaust gas system of a combustion engine, the exhaust gas heater defining a center axis (M) and comprising:

a carrier;

at least one heating conductor mounted on said carrier, said at least one heating conductor being configured for conducting a flow of current through said at least one heating conductor; and, said at least one heating conductor being formed by separation from a flat metal plate and having a heating region over which an exhaust gas (A) can flow and a holding region held on said carrier, said holding region being arranged radially outside of said heating region relative to said center axis (M), wherein said at least one heating conductor includes a plurality of meandering-winding fields arranged directly one adjacent the other successively in a circumferential direction, wherein each meandering-winding field of the plurality of meandering-winding fields has a plurality of meandering-winding sections arranged in radial succession with reference to said exhaust gas heater center axis (M) and extending in a circumferential direction, wherein, in each meandering-winding field of the plurality of meandering-winding fields, at least one meandering-winding section, in a first circumferential end, adjoins a radially further inward positioned meandering-winding section and, in a second circumferential end, adjoins a meandering-winding section positioned further radially outward; and wherein at least one of:

(i) a radially inner meandering-winding section of one meandering-winding field in a radially inner connection region adjoins a radially inner meandering-winding section of a meandering-winding field which is directly adjacent to the one meandering-winding field in a first circumferential direction; and (ii) a radially outer meandering-winding section of the one meandering-winding field in a radially outer connection region adjoins a radially outer meandering-winding section of a meandering-winding field which is directly adjacent to the one meandering-winding field in a second circumferential direction, such that each meandering-winding field of said plurality of meandering-winding fields adjoins the circumferentially directly adjacent meandering-winding fields with the radially inner meandering-winding section or the radially outer meandering-winding section or the radially inner meandering-winding section and the radially outer meandering-winding section exclusively.

2. The exhaust gas heater of claim 1, wherein said at least one heating conductor has a cross sectional contour defined by cornered edges.

3. The exhaust gas heater of claim 1, wherein said at least one heating conductor has a rectangular conductor cross sectional contour.

4. The exhaust gas heater of claim 1, wherein said holding region and said heating region are arranged in a plane transverse to said center axis (M).

5. The exhaust gas heater of claim 4, wherein said plane is orthogonal to said center axis (M).

6. The exhaust gas heater of claim 4, wherein said at least one heating conductor has first and second axial sides; and, at least one of:

(i) said carrier includes a carrier body surrounding said at least one heating conductor radially on the outer side of said at least one heating conductor and radially overlapping said at least one heating conductor in said holding region on at least one of said axial sides of said at least one heating conductor; and, (ii) said carrier includes a supporting arrangement axially supporting said at least one heating conductor on at least one of said axial sides of said at least one heating conductor.

7. The exhaust gas heater of claim 6, wherein:

said carrier body has a first carrier body part and a second carrier body part fixed on said first carrier body part;

said first carrier body part includes an axial portion axially overlapping said holding region radially outside; and; a first radial portion extending radially inward from said axial portion and radially overlapping said holding region, at least in part, on one of said axial sides; and, said second carrier body part includes a second radial portion overlapping said holding region radially, at least in part, on the other one of said axial sides.

8. The exhaust gas heater of claim 7, wherein at least one of said first and second carrier body parts is configured to be annular.

9. The exhaust gas heater of claim 6, further comprising electrically insulating material arranged between said carrier body and said holding region.

10. The exhaust gas heater of claim 1, wherein said heating conductor is devoid of electrically insulating material in said heating region of said at least one heating conductor.

11. The exhaust gas heater of claim 1, wherein at least one of:

(i) said at least one heating conductor has a greater conductor cross section in said holding region thereof than in said heating region of said at least one heating conductor; and, (ii) said at least one heating conductor has a varying cross sectional size in said heating region of said at least one heating conductor.

12. The exhaust gas heater of claim 1, further comprising two connecting portions arranged on said holding region for electrically contacting said at least one heating conductor.

13. The exhaust gas heater of claim 1, wherein, in at least one of said meandering-winding fields, said holding region provides a radial outermost meandering-winding section.

14. An exhaust gas system for a combustion engine, the exhaust gas system comprising:

an annular exhaust gas routing component;

an exhaust gas heater mounted in said annular exhaust gas routing component; and, said exhaust gas heater defining a center axis (M) and including:

a carrier; at least one heating conductor mounted on said carrier, said at least one heating conductor being configured for conducting a flow of current through said at least one heating conductor; said at least one heating conductor being formed by separation from a flat metal plate and having a heating region over which an exhaust gas (A) can flow and a holding region held on said carrier, said holding region being arranged radially outside of said heating region relative to said center axis (M), wherein said at least one heating conductor includes a plurality of meandering-winding fields arranged directly one adjacent the other successively in a circumferential direction, wherein each meandering-winding field of the plurality of meandering-winding fields has a plurality of meandering-winding sections arranged in radial succession with reference to said exhaust gas heater center axis (M) and extending in a circumferential direction, wherein, in each meandering-winding field of the plurality of meandering-winding fields, at least one meandering-winding section, in a first circumferential end, adjoins a radially further inward positioned meandering-winding section and, in a second circumferential end, adjoins a meandering-winding section positioned further radially outward; and wherein at least one of:

(i) a radially inner meandering-winding section of one meandering-winding field in a radially inner connection region adjoins a radially inner meandering-winding section of a meandering-winding field which is directly adjacent to the one meandering-winding field in a first circumferential direction; and (ii) a radially outer meandering-winding section of the one meandering-winding field in a radially outer connection region adjoins a radially outer meandering-winding section of a meandering-winding field which is directly adjacent to the one meandering-winding field in a second circumferential direction, such that each meandering-winding field of said plurality of meandering-winding fields adjoins the circumferentially directly adjacent meandering-winding fields with the radially inner meandering-winding section or the radially outer meandering-winding section or the radially inner meandering-winding section and the radially outer meandering-winding section exclusively.

\* \* \* \* \*